US008338759B2

(12) United States Patent
Whitney et al.

(10) Patent No.: US 8,338,759 B2
(45) Date of Patent: Dec. 25, 2012

(54) HEATING CABLE

(75) Inventors: Wells Whitney, San Francisco, CA (US); Umesh Sopory, San Jose, CA (US)

(73) Assignee: Thermon Manufacturing Company, San Marcos, TX (US)

( * ) Notice: Subject to any disclaimer, the term of this patent is extended or adjusted under 35 U.S.C. 154(b) by 0 days.

(21) Appl. No.: 13/180,112

(22) Filed: Jul. 11, 2011

(65) Prior Publication Data

US 2011/0266276 A1 Nov. 3, 2011

Related U.S. Application Data

(63) Continuation of application No. 12/122,592, filed on May 16, 2008, now Pat. No. 7,989,740.

(51) Int. Cl.
*H05B 3/34* (2006.01)
*H01S 4/00* (2006.01)

(52) U.S. Cl. ........ 219/549; 219/212; 219/528; 219/535; 219/544; 219/542; 219/548; 29/611; 29/592.1

(58) Field of Classification Search .................. 219/212, 219/549, 528, 535, 544, 542, 548; 29/611, 29/592.1
See application file for complete search history.

(56) References Cited

U.S. PATENT DOCUMENTS 2,294,010 A 8/1942 Van Dam
2,379,580 A 7/1945 Hendley
2,581,212 A 1/1952 Spooner et al.
3,538,482 A 11/1970 Dugger
3,757,086 A 9/1973 Indoe
4,037,083 A 7/1977 Leavines
4,100,673 A 7/1978 Leavines
4,503,322 A 3/1985 Kishimoto et al.
4,547,658 A 10/1985 Crowley
4,631,392 A 12/1986 O'Brien et al.
4,733,059 A 3/1988 Goss et al.
(Continued)

FOREIGN PATENT DOCUMENTS

JP 10-030260 A 2/1998
(Continued)

OTHER PUBLICATIONS

International Search Report and Written Opinon of the ISR (from a corresponding foreign application), PCT/US2009/044234, both mailed Jan. 4, 2010.

(Continued)

*Primary Examiner* — Shawntina Fuqua
(74) *Attorney, Agent, or Firm* — Brian N. Young; Fountainhead Law Group P.C.

(57) ABSTRACT

A heating cable includes a bus wire structure that includes a plurality of bus wires. An insulation layer is provided to insulate the plurality of bus wires. A plurality of node areas exposes portions of the bus wires from the insulation. A heating element is wrapped around the bus wire structure in a helical manner. The heating element includes an insulating core and one or more resistance wires wrapped around the core in a helical manner. The heating element is electrically coupled to the nodes of the bus wire structure at the plurality of node areas. The insulating core may be made of a folded-over tape made of a cloth material, such as glass cloth. Pluralities of redundant paths in between two nodes are provided to allow for current to flow in a zone if one of the redundant paths is broken.

20 Claims, 5 Drawing Sheets

U.S. PATENT DOCUMENTS

| | | | | |
|---|---|---|---|---|
| 4,816,649 | A | 3/1989 | Eilentroop | |
| 4,864,107 | A | 9/1989 | Boyal | |
| 5,245,161 | A * | 9/1993 | Okamoto | 219/549 |
| 5,422,462 | A | 6/1995 | Kishimoto | |
| 6,005,232 | A | 12/1999 | Janvrin et al. | |
| 6,144,018 | A | 11/2000 | Heizer | |
| 6,288,372 | B1 | 9/2001 | Sandberg et al. | |
| 7,189,944 | B2 | 3/2007 | Child et al. | |
| 2002/0074328 | A1 | 6/2002 | O'Connor | |
| 2006/0089264 | A1 | 4/2006 | Hong | |
| 2006/0289476 | A1 | 12/2006 | O'Connor | |

FOREIGN PATENT DOCUMENTS

| | | |
|---|---|---|
| KR | 20-1999-0042175 | 12/1999 |
| KR | 20-0414017 Y1 | 4/2006 |
| WO | 2009/140650 | 11/2009 |
| WO | 2009/140651 | 11/2009 |
| WO | 2009/140652 | 11/2009 |

OTHER PUBLICATIONS

International Search Report and Written Opinion of the ISR (from a corresponding foreign application), PCT/US2009/044233, both mailed Jan. 11, 2010.

International Search Report and Written Opinion of the ISR (from a corresponding foreign application), PCT/US2009/04423, both mailed Jan. 4, 2010.

* cited by examiner

HEATING CABLE

CLAIM OF PRIORITY

This application is a continuation of and claims priority from U.S. patent application Ser. No. 12/122,592 filed on May 16, 2008, entitled "HEATING CABLE" which is hereby incorporated by reference as if set forth in full in this document for all purposes.

BACKGROUND

Particular embodiments generally relate to heating cables.

In cold environments, pipes may transport substances, such as oil, steam, and other process streams, etc. When steam or other process streams are transported through the pipes, the heat from the steam or process stream may help keep the pipes from freezing. However, if the system malfunctions, or if the flow of the process stream stops, and steam is not transported through the pipes, the steam condenses and the pipes may freeze. Accordingly, an electric heater may be used to keep the pipes warm to prevent freezing.

Different long-line heaters, generically called heat tracing products, may be used to keep the pipes warm. For example, all types of heaters are used. However, not all heaters may work well at high temperature. This is especially important when substances are transported at high temperatures in the pipes. Also, if the heater fails, then there is a large likelihood that the pipes may freeze and fail. This is a costly repair for a company and very undesirable.

There are several types of series connected heaters and several types of parallel connected. Heat tracing circuits, i.e., the length of pipe that is to be traced, are of varying length. Parallel heaters are desired because they can be cut to length and do not have to be engineered for the particular circuit, as do series heaters. Another difference in heat tracing products is that most of them have polymeric elements or insulation, and some have only inorganic elements and insulation, the latter can withstand very high temperatures for long times. So called self-regulating heat tracers are polymeric based and have parallel circuits, zone heaters have resistance wire heating elements but are generally polymeric insulated. Series heating cables can be either polymeric insulated or have only inorganic elements and insulation, such as MI Cable. However these latter types are not cut to length.

Some problems with zone heaters that use resistance wires for heating elements are that a certain length of resistance wire needs to be included in a zone. Zone lengths become very long because of the length of resistance wire that has to be used. The length between two bared areas may be a zone and a certain amount of resistance wire needs to be included in between a zone to provide the amount of heat desired. Because a large amount of resistance wire may need to be included in between zones, zone lengths that are several feet long are needed. If a resistance wire breaks or a node is bad with poor contacts between resistance wires and bus wires, then an entire zone or maybe two zones do not produce heat. This results in significantly long cold lengths in damaged zone heaters.

SUMMARY

In one embodiment, a heating cable is provided. The heating cable includes a bus wire structure that includes a plurality of bus wires. An insulation layer is provided to insulate the plurality of bus wires. A plurality of node areas exposes portions of one or the other of the bus wires from the insulation.

One of more heating elements is wrapped around the bus wire structure in a helical manner. The heating element includes an insulating core and one or more resistance wires wrapped around the core in a helical manner. The heating element is electrically coupled to the nodes of the bus wire structure at the plurality of node areas that are on alternative sides of the bus wire structure. The insulating core of the heating element may be made of a folded-over tape made of a cloth material, such as glass cloth. The folded-over tape is somewhat stiff and when it folds over it exerts a force that causes it to open up again. This may retain some outward force and allows the resistance wire to form a good connection with the node areas when the heating element is wrapped around the bus wire structure.

The one or more resistance wires are wrapped around the heating element and the heating element is wrapped around the bus wire structure in between the two nodes. This provides shorter effective zones. A plurality of redundant paths in between two nodes is provided to allow for current to flow in a zone if one of the redundant paths is broken.

Further, a clip may be provided that is configured to wrap around the heating cable at a node to secure the electrical connection between the bus wire and the one or more resistance wires at the node. The clip includes a tab and an aperture, where the tab is inserted through the aperture to exert pressure against the one or more resistance wires to secure the electrical connection to one of the bus wires at the node area.

This heater core is further insulated with inorganic materials, such as glass cloth and mica tape. Subsequently, the heating cable also includes a metal sheath enclosing the bus wire structure and the insulated heating element.

A further understanding of the nature and the advantages of particular embodiments disclosed herein may be realized by reference of the remaining portions of the specification and the attached drawings.

DETAILED DESCRIPTION OF EMBODIMENTS

Figure 1:
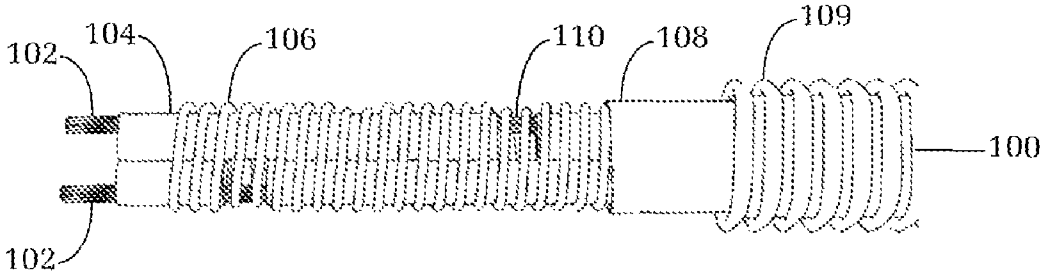
FIG. 1 depicts a heating cable according to one embodiment.

FIG. 1 depicts a heating cable 100 according to one embodiment. Heating cable 100 includes a plurality of bus wires 102 and a first insulation layer 104. Bus wires 102 and first insulation layer 104 combine to form a bus wire structure.

Heating cable 100 also includes a heating element 106 that is wrapped around the bus wire structure. A second insulation layer 108 is wrapped around heating element 106 and the bus wire structure. A metal sheath 109 encloses the bus wire structure and heating element 106.

Bus wires 102 provide electrical power to heating zones. The bus wires may include round, stranded metal-coated copper conductors, narrow bands of copper or other conducting metals, braided copper structures, or other structures that can provide electrical power. In one embodiment, two bus wires 102 are provided and are set parallel to one another. However, it will be understood that any other number of bus wires 102 may be used and can be arranged differently.

First insulation layer 104 surrounds bus wires 102. First insulation layer 104 electrically separates bus wires 102 from heating element 106. First insulation layer 104 may include layers of glass cloth, braided glass fibers, mica sheets, high-temperature silicon gels and pastes, etc.

A spacing structure in between the bus wires 102 to keep the bus wires apart may be provided. A wider heating cable may be desirable to provide higher power outputs that can be distributed over a wider and larger surface area of the heating cable. A spacer such as from glass yarns are wrapped around glass cloth or other inorganic form to form a spacer object that can be situated in between bus wires 102 so they are spaced apart a suitable distance.

First insulation layer 104 may include bared areas that are referred to as nodes 110. The bared areas are where insulation has been removed to expose a portion of one of bus wires 102. Node 110 allows heating element 106 to contact bus wire 102. As will be described in more detail below, an electrical connection is formed at nodes 110.

Second insulation layer 108 is wrapped around the heating element 106 and bus wire structure to electrically insulate heating element 106 from the metal sheath that encloses it. Second insulation layer 108 may include layers of glass cloth tapes and mica/glass cloth tapes, or other suitable high temperature insulation materials.

Metal sheath 109 encloses the outside of the bus wire structure and heating element 106. Metal sheath 109 may protect the bus wire structure and heating element 106 from moisture ingress. Metal sheath 109 may be corrugated to allow flexibility. Accordingly, metal sheath 109 may afford an appropriate amount of mechanical and chemical protection to the bus wire structure and heating element 106. Materials used for metal sheath 109 may include stainless steel, incoloy alloys, inconel alloys, high-temperature aluminum, and other chemically-resistant steels. Other embodiments of metal sheath 109 may include a tape that is seam-welded on one side or both sides, a tape that has been slightly corrugated before welding, a tube, a slightly-flattened tube, a corrugated tube, and a slightly-flattened corrugated tube.

In one example, bus wires 102 are substantially flat. A flat bus wire creates a structure that is more round than oval (using stranded or round bus wires 102 cause a more oval shape to be formed). The round shape sometimes allows the structure to be inserted in metal sheath 109 easier in the field.

Heating element 106 may include an insulating core and one or more resistance wires wrapped around the core in a helical manner. Although the following combination of heating element 106 and bus wires 102 are described, it will be understood that other variations may be used. For example, heating element 106 may or may not be insulated. Also, bus wires 102 may be insulated or not, and may be situated on the inside or outside of heating element 106. Other combinations may also be appreciated. Further embodiments of heating cable 100 may be disclosed in U.S. patent application Ser. No. 12/122,599, entitled "HEATING CABLE WITH A HEATING ELEMENT POSITIONED IN THE MIDDLE OF BUS WIRES" and U.S. patent application Ser. No. 12/122,594, entitled "HEATING CABLE WITH INSULATED HEATING ELEMENT", both of which are filed concurrently and incorporated by reference in their entirety for all purposes.

Figure 2A:
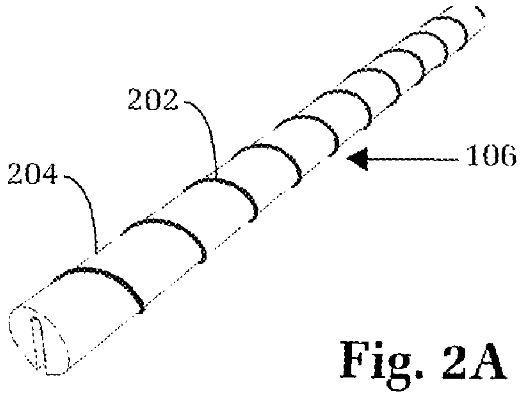
FIGS. 2A, 2B, and 2C depict examples of a heating element according to various embodiments.
Figure 2B:
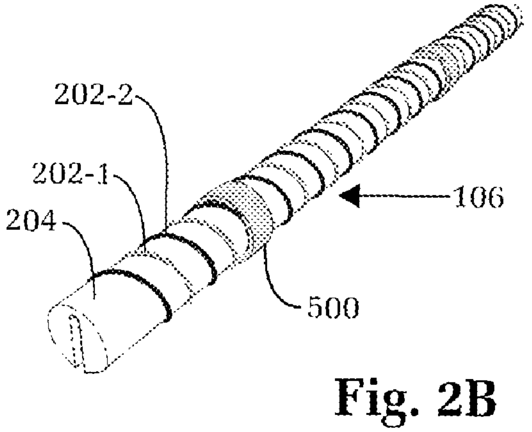
Figure 2C:
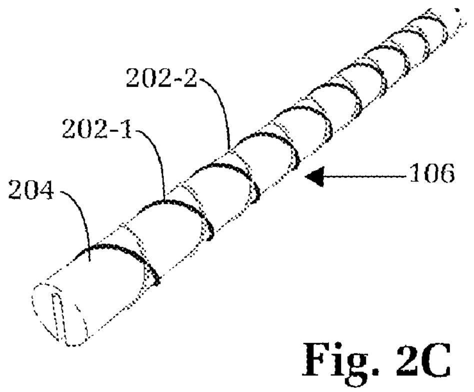

FIGS. 2A, 2B, and 2C depict examples of heating element 106 according to various embodiments. FIG. 2A shows an example of heating element 106 that includes a resistance wire 202 wrapped around an insulating core 204 according to one embodiment. Resistance wires 202 may include a metal wire, such as a fine gauge, high-resistance metallic alloy wire (Nichrome or Kanthol). In one example, 40 American wire gauge (AWG) resistance wire (e.g. Nichrome-60 wire, NiCr60 T-type 675 nickel chrome alloy) may be used. Also, different gauge resistance wires may be used (generally from about 10 mils down to 1 mil in diameter).

The insulating core may be a tape, such as a cloth tape made up of a glass material. The tape may be flat and a certain width, length, and height, such as tapes from ¼ to ½ inch width. The cloth tape is folded over to form insulating core 204. As will be described in more detail below, the tape when folded over is somewhat stiff and exerts an outward force because the tape wants to open up again. The tendency to open up maintains an outward force on resistance wire 202. Because resistance wire 202 is wound around insulating core 204, resistance wire 202 is kept taut and tight and is not able to move around or slip around insulating core 204. Thus, different sections of resistance wire 202 are prevented from touching each other.

The use of glass cloth tape also enables different width heating elements 106 to be made easily. For example, additional cloth tape may be wrapped around to form a thicker or thinner insulating core 204. By providing a different width insulating core 204, greater lengths of resistance wire 202 may be used per foot of heating element 106. For example, a thicker insulating core 204 allows more resistance wire 202 to be wrapped around it per linear foot. This may be important when more resistance wire is desired per zone. Different combinations of spacing pitch of the wrapping of heating elements give different resistances and power output of the heating cable depending on applied voltages, as will be described in more detail below. Accordingly, flexibility is provided using the cloth tape in addition to providing an outward force to tightly wind resistance wires 202 around insulating core 204.

FIG. 2B shows two resistance wires 202-1 and 202-2 that are wrapped around insulating core 204 in the same direction. Also, a clip 500 is included to tie both resistance wires 202 together. This provides redundancy in case a resistance wire is cut. Clip 205 allows current to continue to flow from a cut wire at the tying point. FIG. 2C depicts two resistance wires 202-1 and 202-2 wrapped around insulating core 204 in opposite directions. Other ways of wrapping resistance wires 202 may be appreciated. Wrapping resistance wire 202 in this manner provides redundancy, which allows a resistance wire to be cut or fail, but still allows a zone to be heated using redundancy. Other methods of providing redundancy using a circuit or wire may be used.

Figure 3A:
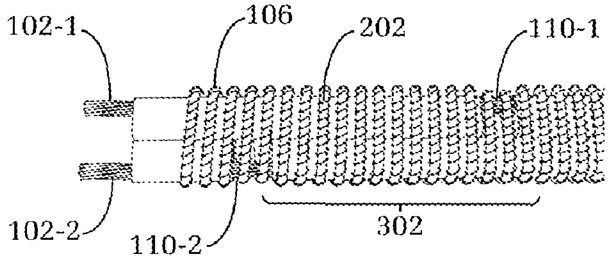
FIG. 3A depicts an example of the heating element being wrapped around the bus wire structure according to one embodiment.

After wrapping resistance wires 202 around insulating core 204, heating element 106 then wraps around the bus wire structure as shown in FIG. 1. A heating zone may be a zone in between nodes 110, which are on alternatively opposite bus wires. FIG. 3A depicts an example of heating element 106 being wrapped around the bus wire structure according to one embodiment. The zone may be in between nodes 110-1 and 110-2. Although this zone is shown, it will be understood that multiple zones are included on heating cable 100.

Resistance wire 202 may contact bus wire 102 at nodes 110. This provides an electrical connection between resistance wires 202 and bus wires 102. When a voltage is impressed on bus wires 102, resistance wire 202 generates heat. For example, current can flow through resistance wires 202. In between the zones 302, heat is produced on resistance wires 202.

The zone length of zone heaters using fine gauge resistance wire as a resistance element depends on the overall resistance between nodes 110. This depends on the resistance per unit length of resistance wires 202, its length within zones 302, and the amount of heat desired and voltage applied to bus wires 102. If a fine gauge resistance wire is about 42 AWG (0.0025 inch diameter), the resistance is about 100 ohms/foot of length, a length of fine gauge wire to produce 10 watts/foot of heater at 240 volts AC is necessarily very long (wire length=240*240/10*100=57.6 feet of fine gauge wire). Particular embodiments provide this length of fine gauge wire into a shorter length of heater. By wrapping resistance wires 202 around insulating core 204 to form heating element 106, and then wrapping heating element 106 around the bus wire structure, shorter zone lengths are provided. This is because the length of resistance wire needed in a zone is shortened by wrapping the resistance wire around insulating core 102 and then wrapping heating element 106 around the bus wire structure. For example, a zone length may be about 1 or 2 feet using particular embodiments. By providing shorter zone lengths, if a zone is cut, only a small part of the pipe may not be heated. Also, by wrapping heating element 106 helically around the bus wire structure, more resistance wire is used within a zone and may produce more heat.

Accordingly, resistance wire 202 can be wound around the glass cloth fabric such that the length of resistance wire 202 is several times the length of the insulating core. Resistance wire 202 may be wound around insulating core 204 and wound around another insulating core 204 to produce an even greater length of resistance wire and this process may be repeated again and again. Resistance wires 202 may be sewn into glass cloth fabric in a zigzag fashion. Also, resistance wires 202 can be woven into glass cloth fabric and then that glass cloth fabric can be cut on a bias to produce angled redundant long resistance wire paths between bus wires.

Figure 3B:
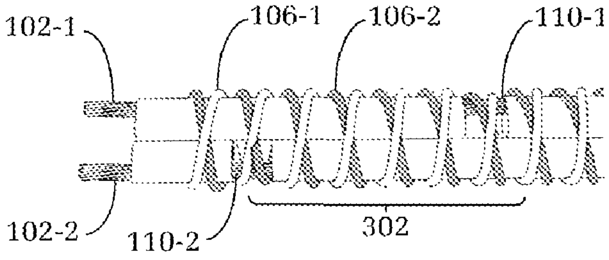
FIGS. 3B and 3C depict different embodiments of multiple heating elements wrapped around the bus wire structure according to one embodiment.
Figure 3C:
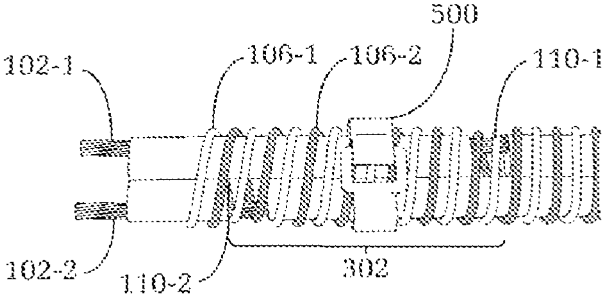

Particular embodiments also provide redundancy within zones 302 using heating elements 106, as long as the resistance wires and or the heating elements are electrically connected in some way within that zone. Thus, redundancy can be provided using resistance wires 202 and/or heating elements 106. For example, FIGS. 3B and 3C depict different embodiments of multiple heating elements 106 wrapped around the bus wire structure according to one embodiment. According to embodiments, redundancy is provided in between zones 302 because if one resistance wire 202 is cut on one heating element 106, the other heating element 106 may still be functioning. For example, if a resistance wire 202 on heating element 106-1 is cut, it will not produce heat in between zone 302. However, if resistance wire 202 for heating element 106-2 has not been cut, then it still is electrically connected to nodes 110-1 and 110-2 and conducts heat. Thus, the heating cable still conducts heat in zone 302.

Further, as seen in FIG. 3B, heating element 106-1 and heating element 106-2 are overlapped in opposite directions. In FIG. 3C, two heating elements 106 are wrapped in a co-rotating manner onto insulating core 204. Two heating elements 106 may be substantially equally spaced apart along insulating core 204. In FIG. 3B, when heating elements 106 are wrapped in opposite directions, they touch and make electrical contact at every place that they cross over and touch. This provides additional redundancy because electrical contact is continued at each overlapping point. If a resistance wire 202 is cut at one point, electrical contact at an overlapping point is re-established if the other resistance wire 202.

In FIG. 3C, when heating elements 106 are wrapped in the same direction, then they do not overlap to make electrical contact, except at the ends at the node connections. However, clips 500 may also be used to provide redundancy in between nodes. The ties provide electrical contact between multiple resistance wires. The ties may be wires that connect resistance wires 202 together electrically. Also, ties may be other connectors that are able to make electrical connections. A mechanical fastener may also be used that hold resistance wires 202 together and also provides electrical connection.

Figure 5A:
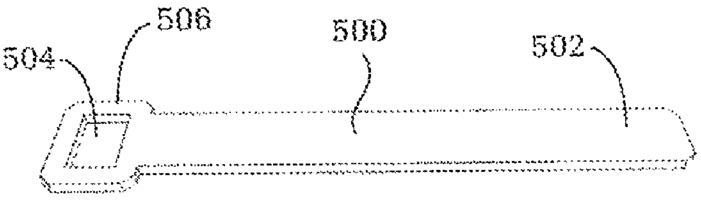
FIG. 5A depicts an example of a mechanical fastener that may be used to enhance the connection at a node according to one embodiment.

FIG. 5A depicts an example of a mechanical fastener that may be used to enhance the connection at node 110 according to one embodiment. Also, clip 500 (or other ties) may be used to connect resistance wires in between nodes 110. Clip 500 includes a tab 502 and an aperture 504. Aperture 504 is found in a head area 506. Also, clips may also include staples, crimps, metal wires, and spring-loaded jaws. Further, spot-welding, soldering or brazing, or other metal-to-metal bonding, such as wrapping wires around the entire bus wire structure, may be used.

If a good electrical connection is not made at nodes 110, then electrical contact may be disconnected physically. Also, if a good connection is not made, nodes 110 may become higher in contact resistance over time under the high temperature conditions during the use of the heating cable. High contact resistance at node 110 leads to poor electrical contact and/or voltage drop at that point that could destroy the contact and/or resistance wire at node 110 over time.

The many wraps of resistance wires 202 around insulating core 104 in heating element 106 and the long length of bus wires causes resistance wire 202 to contact bus wires 102 in many spots at each node 110. Using clip 500, the node may be encased and resistance wire 202 is held with firm physical contact onto bus wire 202.

Figure 5B:
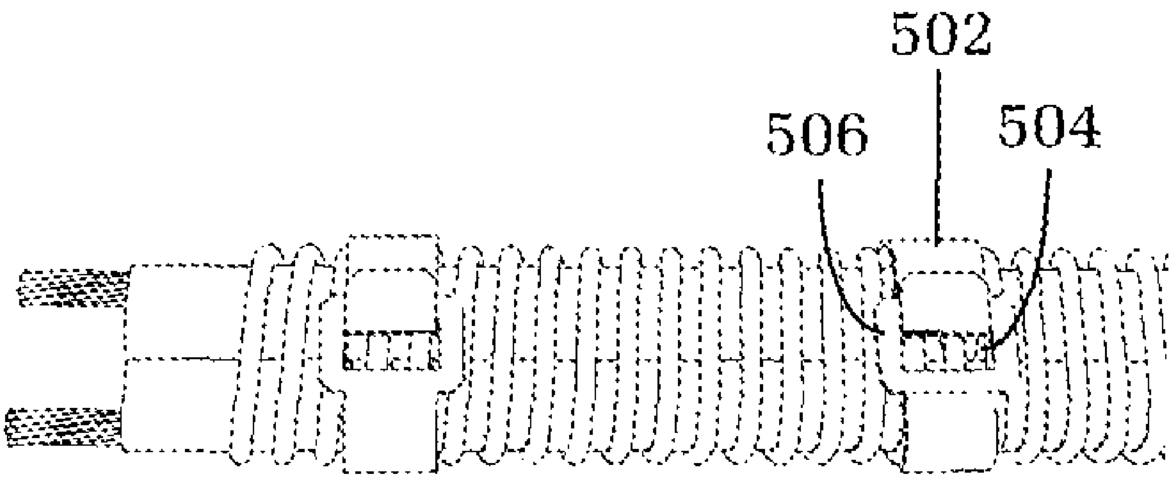
FIG. 5B shows a tie attached to the heating cable according to one embodiment.

FIG. 5B shows clip 500 attached to the heating cable according to one embodiment. As shown, tab 502 covers node 110. Clip 500 is kept in place by inserting an end of tab 502 through aperture 504 and bending the end of the tab over after pulling the tab tight. By bending the tab over, clip 500 is firmly attached to node 110. Clip 500 exerts force on resistance wires 202 against bus wires 102 to provide good electrical and physical contact. Clip 500 exerts pressure on resistance wires 202 because the end of tab 502 is inserted under the head 506 of clip 500 and then bent over above head 506. Because of this design, an inward force is exerted by the bending over of tab 502 on top of head 506 and thus provides firm pressure against resistance wires 202, which in turn provides good contact with bus wires 102.

Clip 500 provides many advantages of making electrical and physical contact over node 110. A wide area can be covered using clip 500 where resistance wires 202 touch bus wires 102. Further, the entire area of node 110 may be contacted to make contacts with all the resistance wires 202 that are contacting bus wire 102 in node 110.

The contact between bus wires 102 and resistance wires 202 should be a good both electrically and physically. The connection should be able to withstand high temperature and remain in good contact upon mechanical stress and cycling between low and high temperatures. The connection between resistance wires 202 and bus wires 102 can be made in various ways. For example, only physical contact may be provided between resistance wires 202 and bus wires 102 by wrapping heating element 106 around the bus wire structure. In one example, the folded glass tape may exert the outward force, which may provide a better electrical connection between resistance wires 202 and bus wires 102. For example, the outward force may cause resistance wires 202 to physically stay against bus wire 102. In the example shown in FIG. 3C, the use of clip 500 also connects heating elements 106-1 and 106-2 together by virtue of covering resistance wires 202 with a metallic tab. Thus, connections between resistance wires 202 of both heating elements 106-1 and 106-2 are provided. This provides redundancy in that if one resistance wire 202 is broken for heating element 106-1, with clip 500, the electrical connection may be continued as heating element 106-1 and 106-2 are connected together at a node 110. Thus, at most a zone may be lost due to a damaged heating element 106.

Accordingly, particular embodiments provide good mechanical and electrical contact between heating element 106 and bus wires 102 at nodes 110. This contact is maintained for design lifetime of the heating cable under mechanical and temperature extremes during the use of the heating cable.

Figure 4A:
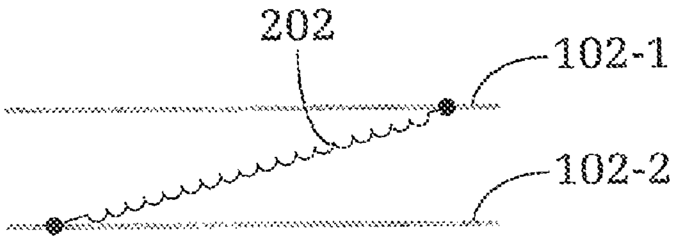
FIGS. 4A, 4B, and 4C depict examples of electrical circuits according to particular embodiments.
Figure 4B:
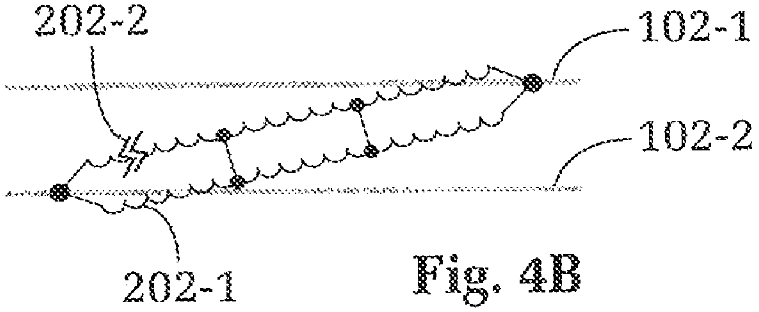
Figure 4C:
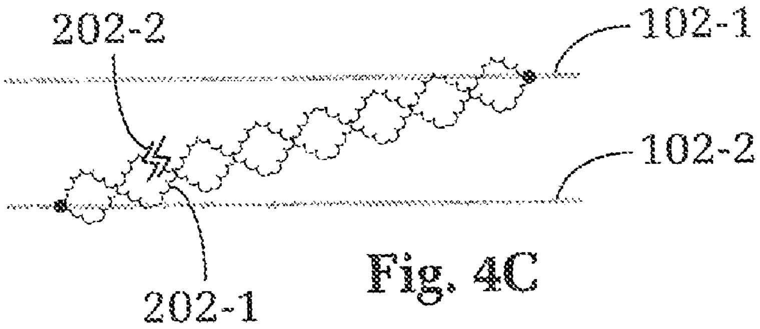

FIGS. 4A, 4B, and 4C depict examples of equivalent electrical circuits according to particular embodiments. The electric circuits are formed by heating element 106. A circuit provides redundancy if a break 404 occurs in resistance wire 202. For example, if a single resistance wire 202 is wrapped around insulating core 204, and if a break occurs in a resistance wire, then the zone will be broken if a circuit does not provide a different path.

As shown in FIG. 4A, if a break occurs on resistance wire 202, then a redundant path may not be provided. This prevents a continuous circuit to be formed during the break. However, in FIGS. 4B and 4C, redundancy is provided. For example, if a break 406-1 also occurs on resistance wire 202-2, another path may be provided to connect resistance wires 202 together. In this case, resistance wires 202-1 and 202-2 are connected together with ties. At the tie points, an electrical connection between resistance wires 202-1 and 202-2 is formed and current can flow through both wires 202.

In FIG. 4C, resistance wires 202-1 and 202-2 crisscross as described in FIG. 2C. At each point, an electrical connection is formed. When a break occurs, a path still exists on the other side of the circuit 402-3 and current can flow through both resistance wires 202 at the next overlap point.

Figure 6:
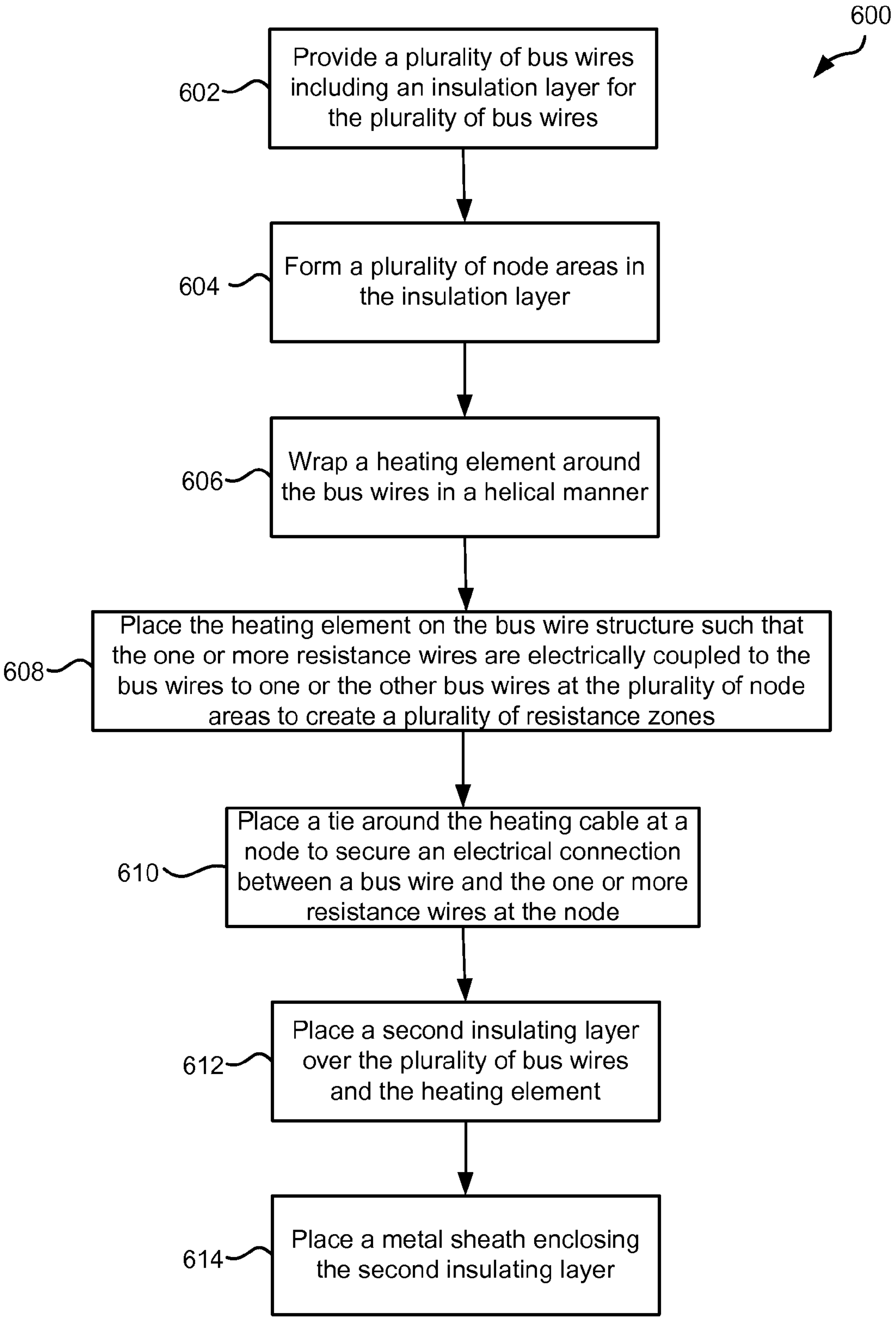
FIG. 6 depicts a simplified flowchart of a method for manufacturing a heating cable according to one embodiment.

FIG. 6 depicts a simplified flowchart 600 of a method for manufacturing a heating cable according to one embodiment. Step 602 provides a plurality of bus wires including an insulation layer for the plurality of bus wires.

Step 604 forms a plurality of node areas in the insulation layer. The node areas expose portions of one or the other of the bus wires from the insulation.

Step 606 wraps a heating element around the bus wires in a helical manner. The heating element includes an insulating core and one or more resistance wires wrapped around the core in a helical manner.

Step 608 places the heating element on the bus wire structure such that the one or more resistance wires are electrically coupled to the bus wires to one or the other bus wires at the plurality of node areas to create a plurality of resistance zones. A plurality of redundant paths in between two nodes are provided to allow for current to flow in a zone if one of the redundant paths are broken.

Step 610 places a tie around the heating cable at a node to secure an electrical connection between a bus wire and the one or more resistance wires at the node. The tie includes a tab and an aperture. The tab is inserted through the aperture to exert an inward pressure against the one or more resistance wires to secure the electrical connection to one of the bus wires at the node area. and Step 612 places a second insulating layer over the plurality of bus wires and the heating element Step 614 places a metal sheath enclosing the second insulating layer.

Particular embodiments provide redundancy and reliability. For example, redundancy is provided in which resistance wires may be broken but alternate paths are provided such that the connection is not lost between zones. Also, good contact is provided at nodes due to a clip that holds resistance wires firm to bus wires 102 at nodes 110. Also, shorter zone lengths are provided because resistance wires 202 are wrapped around insulating core 204, which then is wrapped around a bus wire structure. Thus, longer lengths of resistance wire may be wrapped around in a zone thus resulting in shorter zone lengths.

Accordingly, particularly embodiments reduce the danger of non-heated lengths of zones for a particular element that is being heated, such as a pipe. Redundancy, reliability, and shorter zone length provide a better heating cable.

In one embodiment, metal sheath 109 may be removed. A tape, such as glass fiber-mica tape, may be wrapped around heating element 106 and the bus wire structure. A metal braid layer then encloses the glass cloth insulation and then a high temperature resistant polymeric jacket encloses the outer braid layer. The braid layer provides electrical protection and can be grounded and provides mechanical protection for the heating cable. The polymeric jacket material can withstand a long-term high temperature environment.

An example will now be discussed but it will be understood that other examples will be appreciated. Two heating elements 106 of medium length are wrapped in a co-rotated manner between a node 110-1 on one bus wire 102-1 to a node 110-2 on another bus wire 102-2. There may be two electrical circuits 402, made by inserting ties between the heating elements, connecting heating elements 106 at one-third points between nodes 110. The heater produces 20 watts/unit length at 120 volts AC. By Ohm's Law, the total resistance between nodes is 720 ohms, each of the three sections having resistance of 240 ohms and producing 6.67 watts. The current flow through the heater is 0.278 amps.

If resistance wire 202 on each heating element 106 is made of 38AWG resistance wire with a resistance of 48 ohms/feet of wire length, then 16 feet of resistance wire is needed between nodes 110. If this resistance wire is wrapped around bus wires in a conventional zone heater configuration, then the zone length of the heater would be about 4 feet. However, particular embodiments may achieve a zone length of 1.33 feet by wrapping resistance wire 202 around insulating core 106. If two parallel resistance wires 202 are used, then the zone length may be doubled.

If one resistance wire 202 in one section of a heating element 106 is broken, then that section has resistance of 480 ohms and the other two sections still have resistance of 240 ohms each, and the sections are in series. Since total resistance is now 160 ohms, the current flow is 1.56 amps. The overall power output of the heater is now 15 watts, distributed as 7.5 watts in a section where the wire is broken and 3.75 watts in each of the other two sections. Though one resistance wire 202 has been broken, heat is still produced in all sections of a zone.

The above example is only an example and can be extended to additional redundant resistance wires 202 or heating elements 106 in parallel, as well as more electrical circuit ties between resistance wires 202. With increased parallel resistance wires 202, the distance between nodes 110 increases, however the inclusion of an increased number of electrical circuit ties 402 between resistance wires 202 decreases the effective zone length of the heating cable. This can also apply to the counter-rotated wrapped resistance wires 202 which also contain redundancy and for which power output reduction on a break in the wire is minimal.

Although the description has been described with respect to particular embodiments thereof, these particular embodiments are merely illustrative, and not restrictive. For example, heating cable may be used to provide heat to a number of different structures and is not limited to pipes.

It will also be appreciated that one or more of the elements depicted in the drawings/figures can also be implemented in a more separated or integrated manner, or even removed or rendered as inoperable in certain cases, as is useful in accordance with a particular application. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A heating cable for high temperature environments, the heating cable comprising:

- a bus wire structure comprising:
  - a plurality of bus wires; and
  - a first insulation layer for the plurality of bus wires, the insulation layer including a plurality of node areas, the node areas exposing portions of the bus wires from the insulation;
- a heating element wrapped around the bus wire structure in a helical manner, the heating element comprising:
  - an insulating core; and
  - a plurality of resistance wires wrapped around the insulating core in a helical manner;
  - a second insulation layer comprising a tape wrapped around the bus wire structure and the heating element; and
  - a corrugated metal sheath enclosing the bus wire structure and the heating element,
  - wherein the heating element is electrically coupled to the nodes of the bus wire structure by coupling the plurality of resistance wires to the bus wires at the plurality of node areas to create a plurality of resistance zones, wherein a plurality of redundant paths in between two nodes are provided to allow for current to flow in a zone if one of the redundant paths is broken.

2. The heating cable of claim 1, wherein:

- the insulating core comprises a folded over tape; and
- the folded over tape exerts an outward force on the plurality of resistance wires.

3. The heating cable of claim 1, wherein the corrugated metal sheath is flexible.

4. The heating cable of claim 1, further comprising a tie configured to wrap around the heating cable at a node to secure an electrical connection between one of the bus wires and the plurality of resistance wires at the node.

5. The heating cable of claim 4, wherein the tie includes a tab and an aperture, the tab being inserted through the aperture to exert an inward pressure against the plurality of resistance wires to secure the electrical connection to one of the bus wires at the node area.

6. The heating cable of claim 1, wherein the insulating core is composed of an inorganic material.

7. The heating cable of claim 6, wherein the inorganic material comprises a glass cloth or mica tape.

8. The heating cable of claim 1, wherein the metal sheath is a structure configured to limit moisture ingress.

9. The heating cable of claim 1, wherein the plurality of bus wires are substantially flat.

10. The heating cable of claim 1, wherein the first insulation layer is composed of an inorganic material.

11. The heating cable of claim 1, wherein the second insulation layer is composed of an inorganic material.

12. The heating cable of claim 1, wherein the heating cable is configured to withstand long term high temperature environments.

13. A method for manufacturing a heating cable for high temperature environments, the method comprising:

- providing a plurality of bus wires including an insulation layer for the plurality of bus wires;
- forming a plurality of node areas in the insulation layer, the node areas exposing portions of the bus wires from the insulation;
- wrapping a heating element around the bus wires in a helical manner, wherein the heating element comprises an insulating core and a plurality of resistance wires wrapped around the core in a helical manner;
- wrapping a second insulation layer comprising a tape around the bus wire structure and the heating element; and
- enclosing the bus wire structure and the heating element with a corrugated metal sheath,
- placing the heating element on the bus wire structure such that the plurality of resistance wires are electrically coupled to the bus wires to one or the other bus wires at the plurality of node areas to create a plurality of resistance zones, wherein a plurality of redundant paths in between two nodes are provided to allow for current to flow in a zone if one of the redundant paths is broken.

14. The method of claim 13, wherein the insulating core is composed of an inorganic material.

15. The method of claim 14, wherein the inorganic material comprises a glass cloth or mica tape.

16. The method of claim 13, wherein the metal sheath is a structure configured to limit moisture ingress.

17. The method of claim 13, wherein the plurality of bus wires are substantially flat.

18. The method of claim 13, wherein the first insulation layer is composed of an inorganic material.

19. The method claim 13 wherein the second insulation layer is composed of an inorganic material.

20. The method of claim 13, wherein the heating cable is configured to withstand long term high temperature environments.

* * * * *